US006845630B2

(12) United States Patent
Bruno et al.

(10) Patent No.: US 6,845,630 B2
(45) Date of Patent: Jan. 25, 2005

(54) ELECTRIC POWER AND COOLING SYSTEM FOR AN AIRCRAFT

(75) Inventors: Louis J. Bruno, Ellington, CT (US); Charles E. Lents, Rockford, IL (US); Michael K. Sahm, Avon, CT (US); Wayne A. Thresher, Springfield, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 312 days.

(21) Appl. No.: 10/077,281

(22) Filed: Feb. 14, 2002

(65) Prior Publication Data

US 2004/0014420 A1 Jan. 22, 2004

Related U.S. Application Data

(60) Provisional application No. 60/269,492, filed on Feb. 16, 2001.

(51) Int. Cl.[7] .............................. F25D 9/00; B64D 13/02
(52) U.S. Cl. ............................ 62/323.3; 62/402; 454/71
(58) Field of Search ...................... 62/87, 402, 323.3; 454/71; 290/52

(56) References Cited

U.S. PATENT DOCUMENTS

| | | | | | |
|---|---|---|---|---|---|
| 4,503,666 A | * | 3/1985 | Christoff | ....................... | 60/785 |
| 5,086,622 A | * | 2/1992 | Warner | ........................... | 62/88 |
| 5,442,905 A | * | 8/1995 | Clasys et al. | ............... | 60/39.07 |
| 5,461,882 A | * | 10/1995 | Zywiak | ......................... | 62/401 |
| 5,860,283 A | * | 1/1999 | Coleman et al. | ................ | 62/87 |
| 5,918,472 A | * | 7/1999 | Jonqueres | ....................... | 62/87 |
| 5,956,960 A | * | 9/1999 | Niggeman | .................... | 62/172 |
| 6,124,646 A | * | 9/2000 | Artinian et al. | ................ | 290/52 |
| 6,189,324 B1 | * | 2/2001 | Williams et al. | .............. | 62/172 |
| 6,250,097 B1 | * | 6/2001 | Lui et al. | ....................... | 62/402 |
| 6,408,641 B1 | * | 6/2002 | Skur, III | ....................... | 62/401 |
| 6,615,606 B2 | * | 9/2003 | Zywiak | ......................... | 62/402 |

FOREIGN PATENT DOCUMENTS

WO    WO 98/48162    * 10/1998

* cited by examiner

*Primary Examiner*—William C. Doerrler
(74) *Attorney, Agent, or Firm*—Bachman & LaPointe, P.C.

(57) ABSTRACT

The present invention relates to an electrical power and cooling system for use in an aircraft having at least one engine. The electrical power and cooling system comprises a single shaft, a power turbine mounted on the shaft for receiving fresh pressurized air from the at least one engine, a cooling turbine mounted on the shaft and receiving the fresh pressurized air from the at least one engine, a generator mounted on the shaft, and a fan mounted on the shaft for creating a flow of cooling air. The system further has a condenser for removing moisture from the air exiting the cooling turbine and a mixing chamber for mixing the cooled dry air with recirculated cabin air. The electrical power and cooling system delivers conditioned air to a cabin and/or a flight deck onboard the aircraft and electrical power to the aircraft's electrical systems.

18 Claims, 4 Drawing Sheets

ELECTRIC POWER AND COOLING SYSTEM FOR AN AIRCRAFT

CROSS REFERENCE TO RELATED APPLICATION(S)

This application claims the benefit of U.S. Provisional Patent Application Ser. No. 60/269,492, filed Feb. 16, 2001, entitled ELECTRIC POWER AND COOLING SYSTEM FOR AN AIRCRAFT.

BACKGROUND OF THE INVENTION

The present invention relates to an electric power and cooling system for use on an aircraft.

In addition to propulsion, an aircraft's main engines provide shaft power to drive accessories such as electric generators and pumps, and fresh, pressurized air for the aircraft's environmental control system. This air is used to cool or heat, ventilate, and pressurize the aircraft cabin. The extraction of pressurized air and shaft power from the main engine is referred to as parasitic loss, and must be compensated for by increasing fuel consumption. Not surprisingly, aircraft and engine designers are continuously working on reducing these parasitic losses, and hence reducing the fuel consumption of the main engines.

When the aircraft is on the ground and the main engines are shut down, many aircraft employ an auxiliary power unit. An auxiliary power unit is a small gas turbine engine comprising one or more compressors and a turbine mounted on a shaft. A combustor is disposed between the compressor and the turbine. During operation, the compressor supplies pressurized air to the environmental control system, and the turbine provides shaft horsepower to drive accessories such as an electric generator. Recent technological advances now enable auxiliary power units to start and operate during an in flight emergency such as a main engine shutdown. However, under normal in flight operating conditions, the burden of providing electricity and pressurized air stall falls on the main engines.

One approach to reducing the parasitic losses of the main engines is to combine an auxiliary power unit and an environmental control system into one system and have the auxiliary power unit's compressor continuously provide pressurized air to the environmental control system. Such systems are known in the prior art. Although these systems eliminate the parasitic loss due to the extraction of pressurized air from the main engines, they still require shaft horsepower from the main engines to drive electrical generators. Yet another known approach is to combine an auxiliary power unit and an environmental control system into one system and have the auxiliary power unit drive an electric generator. In such systems however, the auxiliary power unit consumes fuel. Therefore, though the fuel consumption of the main engines is reduced, the overall fuel consumption of the aircraft is not necessarily reduced.

It is also known in the prior art to provide an environmental control system that provides conditioned air to an aircraft's cabin as well as supplying all of the aircraft's electrical needs without an increase of fuel consumption. Such a system is shown in U.S. Pat. No. 5,442,905 to Claeys et al. Despite the existence of such a system, there still remains a need for an environmental control system that can provide both conditioned air and electricity to an aircraft without an increase in fuel consumption.

SUMMARY OF THE INVENTION

It is an object of the present invention to provide an electric power and cooling system for an aircraft which provides conditioned air to an aircraft's cabin as well as supplying all of the aircraft's electrical needs without an increase in fuel consumption.

The present invention achieves the above-stated object.

In accordance with the present invention, an electric power and cooling system for an aircraft having at least one engine broadly comprises a single shaft, a power turbine mounted on the shaft for receiving fresh pressurized air from the at least one engine, a cooling turbine mounted on the shaft and receiving the fresh pressurized air from the at least one engine, a generator mounted on the shaft, and a fan mounted on the shaft for creating a flow of air which can be used to cool engine bleed air. The system further has means for drying the air exiting the cooling turbine prior to delivery of the air to the aircraft's cabin and flight deck. A mixing chamber is provided to mix the cooled dry air with air recirculated from the cabin prior to delivering the air to the cabin. Electrical power generated by the generator is supplied to the aircraft's electrical systems.

Other details of the electric power and cooling system of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1A:
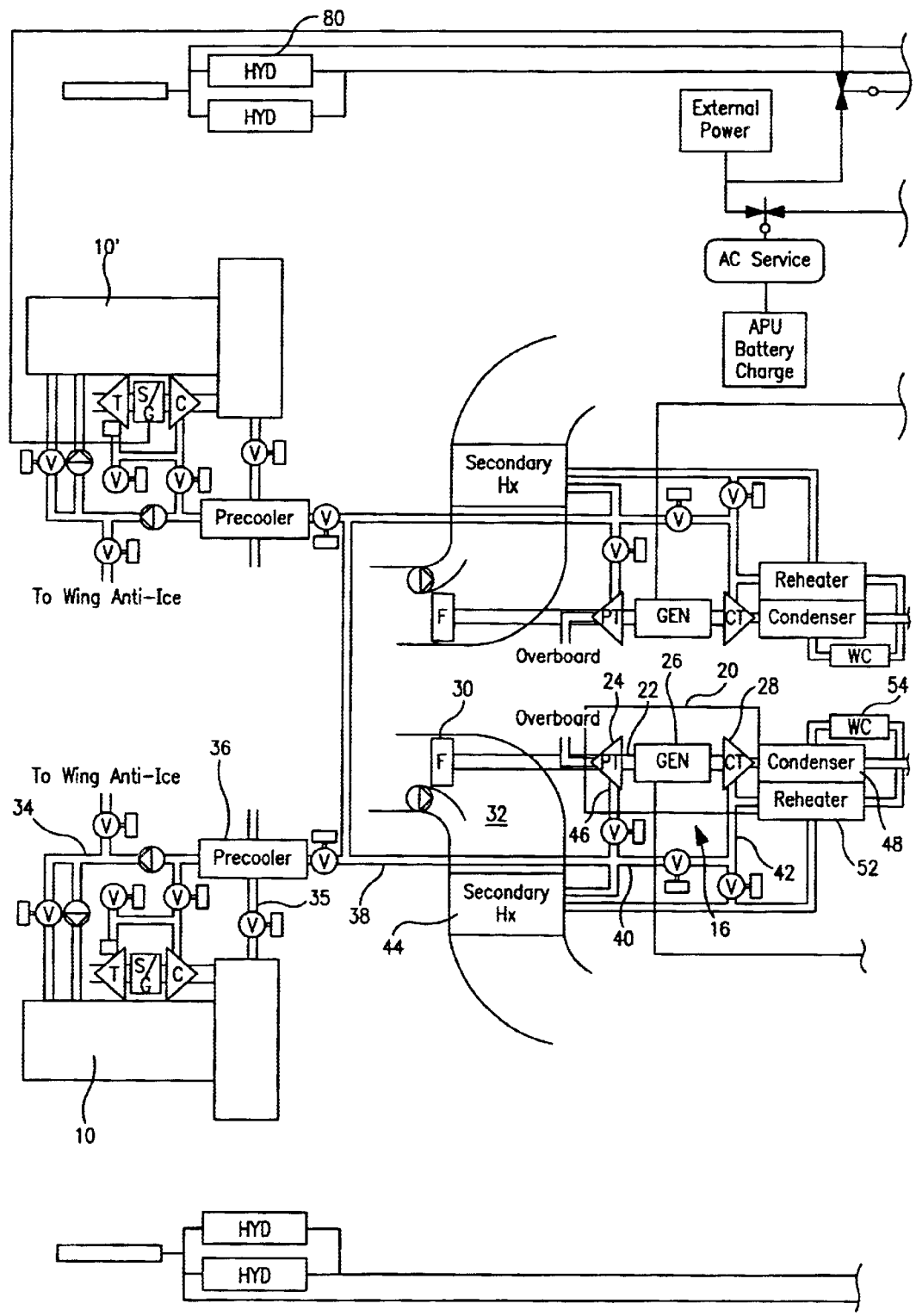
FIGS. 1A and 1B are schematic representations of an aircraft having an electric power and cooling system in accordance with the present invention.
Figure 1B:
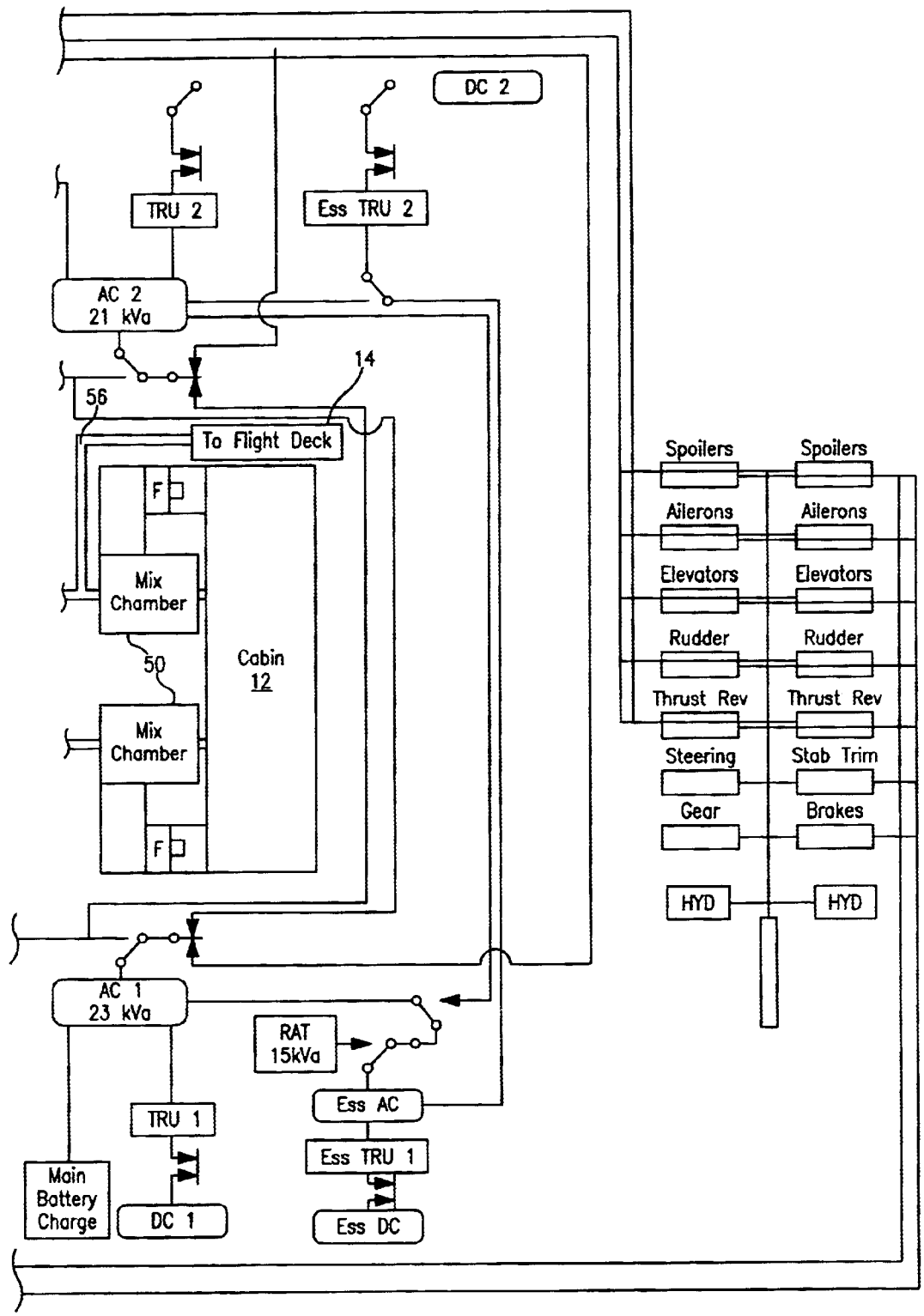

Referring now to FIGS. 1A and 1B, in this embodiment, the aircraft has at least two engines 10 and 10'. The engines 10 and 10' may comprise any suitable jet engine known in the art. The aircraft also has a main cabin 12 and a flight deck 14 which need to be provided with conditioned air. Still further, the aircraft has a number of electrical systems which need to be supplied with electrical power. The electric power and cooling system 16 of the present invention provides conditioned air to the cabin 12 and the flight deck 14 and provides electric power to the aircraft's electrical systems.

The electric power and cooling system 16 includes an electrical power and cooling unit 20. The unit 20 has a single rotating shaft 22 which may be journaled on non-oil lubricated bearings, such as air bearings, or magnetic bearings, or any other suitable bearings known in the art. The unit includes a power turbine 24 mounted to the shaft 22, an electric generator 26 mounted to the shaft 22, and a cooling turbine 28 mounted to the shaft 22. The unit 20 also includes a fan 30 mounted to the shaft 22 and positioned within a ram air duct 32. The fan 30 is primarily used to create a flow of air when the aircraft is on the ground which can be used to cool engine bleed air which is fed to the cooling turbine 28 and/or the power turbine 24. If desired, the fan 30 could also be used in flight to create a desired flow of cooling air.

The power and cooling turbines 24 and 28 respectively in each system 20 each receive bleed air from one of the engines 10 and 10'. Each engine 10 and 10' preferably has two bleed ports for delivering high temperature, high pressure high stage or mid-stage bleed air to delivery line 34. Whether high stage bleed air or mid stage bleed air is delivered to the line 34 depends on flight conditions. The bleed air in line 34 is delivered to precooler heat exchanger 36, preferably mounted in an engine nacelle. The precooler heat exchanger 36 receives first stage fan air via line 35 which acts a heat sink to cool the air delivered via line 34. In the precooler heat exchanger 36, the temperature of the bleed air is reduced.

The cooled bleed air exits the precooler heat exchanger 36 and passes through a secondary heat exchanger 44 where additional heat is removed so that the temperature of the bleed air is near ambient. The secondary heat exchanger 44 is preferably mounted in the ram air duct 32 and uses ram air as its cooling air or heat sink.

Above altitudes above 30,000 feet, the engine bleed air exiting the secondary heat exchanger is fed to the cooling turbine 28 via lines 40 and 42. The bleed air thus delivered drives the cooling turbine 28 which in turn drives the shaft 22 and the generator 26. If the cooling turbine 28 does not generate sufficient power to drive the generator 26, bleed air may also be fed to the power turbine 24 via line 46. The power turbine 24 also causes the shaft 22 to rotate and thus drive the generator 26. Air exiting the power turbine 24 is dumped overboard. Air exiting the cooling turbine 28 passes through a condenser 48 where moisture is removed from the air. From the condenser 48, the cooled dry air is fed to a mix chamber 50 where it may be mixed with air recirculated from the cabin 12. From the mix chamber 50, the cooled dry air is introduced into the cabin 12.

At altitudes below 30,000 feet, there is a greater need to remove moisture from the bleed air. Thus, the engine bleed air exiting the secondary heat exchanger 44 may be passed through a loop containing reheater 52, the condenser 48, and a water collector 54. After passing back through the reheater 52, the dry air is supplied to the cooling turbine 28 where energy is extracted to drive the shaft 22. From the cooling turbine 28, the air is passed through the condenser 48 to the mix chamber 50 and then to the cabin 12.

A line 56 is provided so that fresh pressurized bleed air is always provided from the condenser 48 to the flight deck 14.

The electric power generated by the generator 26 is supplied to the electrical systems onboard the aircraft using any suitable system known in the art. For example, the electric power generated by the generator 26 may be supplied to electric pumps 80 for operating the aircraft's hydraulic systems.

Figure 2A:
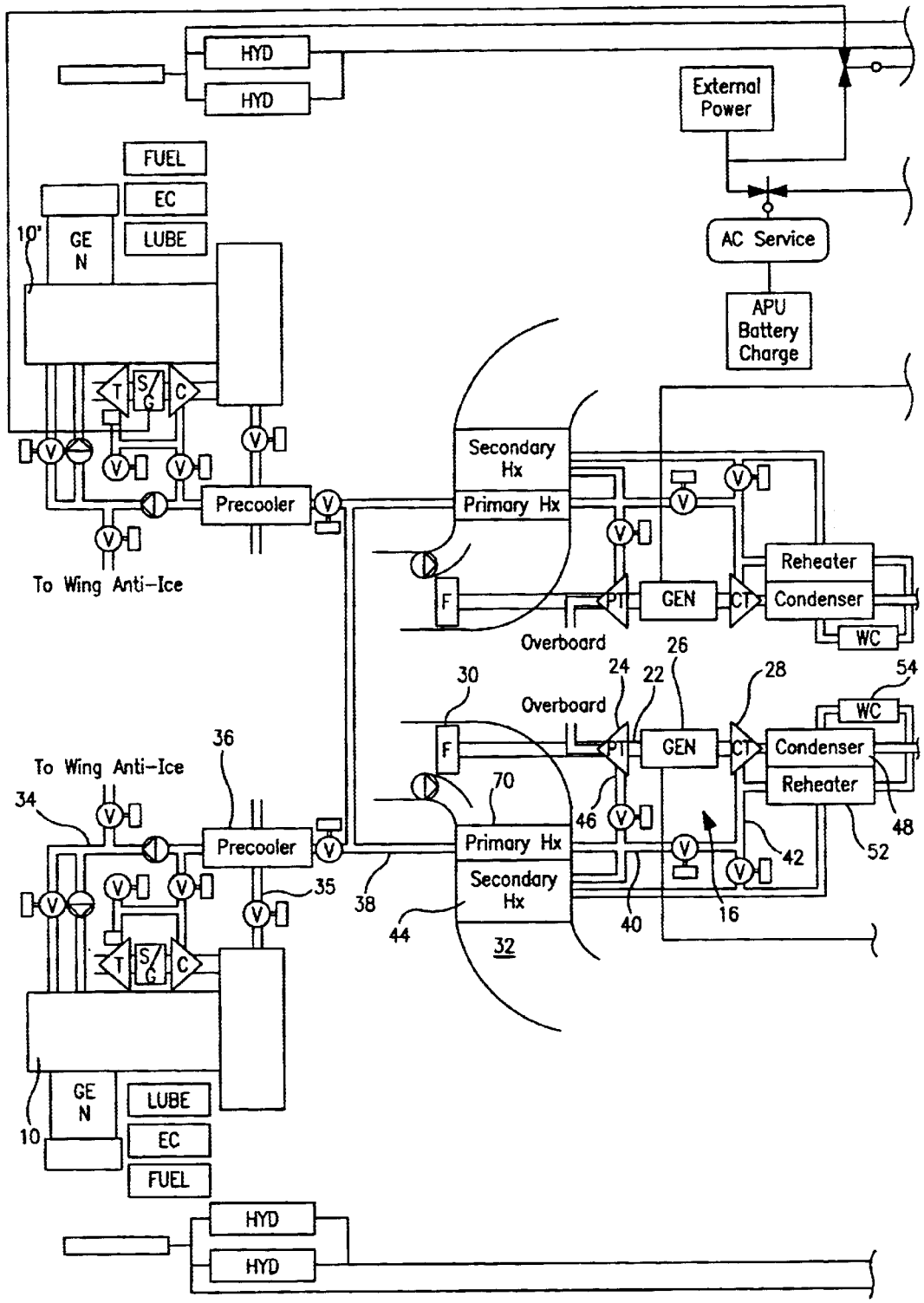
FIGS. 2A and 2B are schematic representations of an alternative embodiment of an electric power and cooling unit.
Figure 2B:
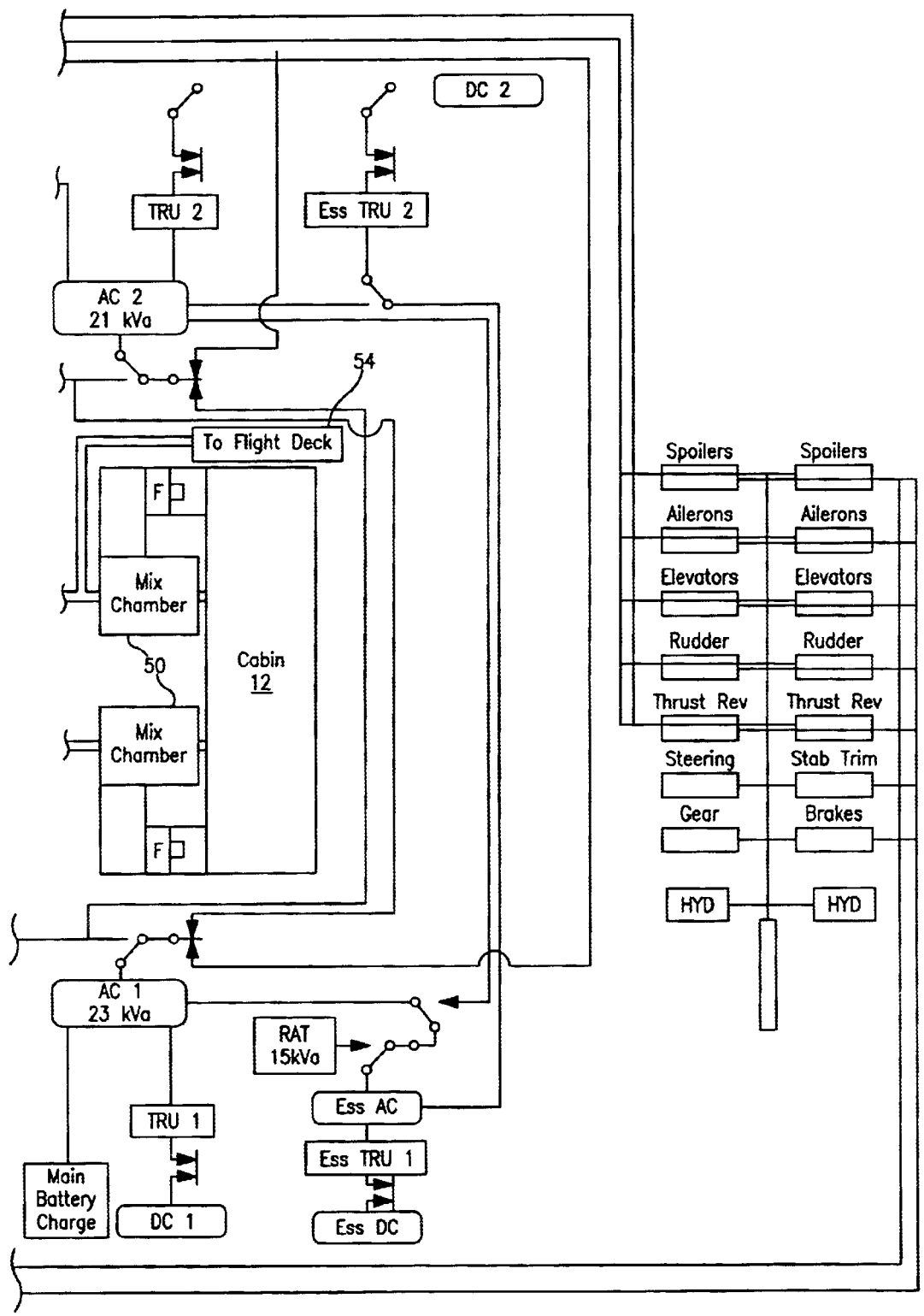

Referring now to FIGS. 2A and 2B, the architecture of the unit 16 is the same as in FIGS. 1A and 1B. However, if desired, a primary heat exchanger 70 may be provided between the precooler heat exchanger and the power turbine 24. In a preferred embodiment, the primary heat exchanger 70 is mounted in the ram air duct 32, either in series with the secondary heat exchanger 44 (as shown) or in parallel with the secondary heat exchanger 44. The primary heat exchanger cools the air feeding the power turbine 24 and the secondary heat exchanger 44. If desired, the discharge of the power turbine 24 could be used for equipment cooling and compartment ventilation.

In both embodiments, when the aircraft is on the ground, the bleed air necessary to the operation of the electric power and cooling unit may be supplied from an auxiliary power unit (not shown). The auxiliary power unit may be onboard the aircraft or external to the aircraft.

It is apparent that there has been provided in accordance with the present invention an electric power and cooling system which fully satisfies the objects, means, and advantages set forth hereinbefore. While the present invention has been described in the context of specific embodiments thereof, other alternatives, modifications, and variations will become apparent to those skilled in the art having read the foregoing description. Therefore, it is intended to embrace those alternatives, modifications, and variations which fall within the broad scope of the appended claims.

What is claimed is:

1. An electric power and cooling system for supplying electric power and conditioned air to an aircraft having at least one engine comprising a single shaft, a power turbine mounted on the shaft for receiving fresh pressurized air from said engine, a cooling turbine mounted on said shaft and receiving said fresh pressurized air from said engine, a generator mounted on said shaft, and a fan mounted on said shaft for creating a flow of air for cooling said fresh pressurized air.

2. An electric power and cooling system according to claim 1, further comprising a precooler heat exchanger disposed between said at least one engine and said power turbine, said precooler heat exchanger receiving at least one of mid stage bleed air and high stage bleed air from said at least one engine and delivering cooled bled air to said power turbine.

3. An electric power and cooling system according to claim 2, further comprising means for delivering first stage fan air to said precooler heat exchanger for use as a heat sink.

4. An electric power and cooling system according to claim 2, wherein said precooler heat exchanger is mounted in a nacelle of said at least one engine.

5. An electric power and cooling system according to claim 2, further comprising a primary heat exchanger disposed between the precooler heat exchanger and said power turbine for removing heat from said bleed air.

6. An electric power and cooling system according to claim 5, wherein said primary heat exchanger is mounted in a ram air duct.

7. An electric power and cooling system according to claim 5, further comprising a secondary heat exchanger disposed between said primary heat exchanger and said cooling turbine.

8. An electric power and cooling system according to claim 7, further comprising said secondary heat exchanger being mounted in a ram air duct upstream of said primary heat exchanger.

9. An electric power and cooling system according to claim 2, further comprising a secondary heat exchanger being disposed between said precooler heat exchanger and said cooling turbine for removing additional heat from said cooled bleed air so that said air exiting said secondary heat exchanger has a temperature near ambient.

10. An electric power and cooling system according to claim 9, wherein said secondary heat exchanger is mounted in a ram air duct and uses ram air as a heat sink.

11. An electric power and cooling system according to claim 10, further comprising means for delivering said near ambient temperature air from said secondary heat exchanger to at least one of said cooling turbine and said power turbine to generate power for driving said generator.

12. An electric power and cooling system according to claim 11, further comprising means for dumping air exiting the power turbine overboard the aircraft.

13. An electric power and cooling system according to claim 11, further comprising a condenser for removing moisture from air exiting said cooling turbine and creating a flow of cooled dry air.

14. An electric power and cooling system according to claim 13, further comprising a mix chamber for mixing said cooled dry air with recirculated air from an aircraft cabin and means for delivering mixed air from said mix chamber to said aircraft cabin.

15. An electric power and cooling system according to claim 11, further comprising means for removing moisture from said bleed air prior to delivering said bleed air to said cooling turbine and said moisture removing means including a loop containing a reheater, a condenser, and a water collector.

16. An electric power and cooling system according to claim 13, further comprising means for delivering a flow of cooled dry bleed air from said condenser directly to a flight deck of said aircraft.

17. An electric power and cooling system according to claim 1, further comprising means for supplying electric power generated by said generator to aircraft electric systems.

18. An electric power and cooling system according to claim 1, further comprising means for supplying electric power generated by said generator to electric pumps for operating aircraft hydraulic systems.

* * * * *

UNITED STATES PATENT AND TRADEMARK OFFICE
CERTIFICATE OF CORRECTION

| | | |
|---|---|---|
| PATENT NO. | : 6,845,630 B2 | Page 1 of 1 |
| APPLICATION NO. | : 10/077281 | |
| DATED | : January 25, 2005 | |
| INVENTOR(S) | : Louis J. Bruno et al. | |

It is certified that error appears in the above-identified patent and that said Letters Patent is hereby corrected as shown below:

In column 6, after claim 18, insert claim 19
-- 19. An electric power and cooling system for supplying electric power and conditioned air to an aircraft having at least one engine, said system comprising means for bleeding air from said at least one engine, means for precooling said bleed air, means for delivering said precooled air to a means for further cooling said bleed air, a single shaft, a power turbine mounted on the shaft for receiving said further cooled bleed air directly from said further cooling means, a cooling turbine mounted on said shaft and also receiving said further cooled bleed air directly from said further cooling means, a generator mounted on said shaft for supplying electrical power to aircraft electric systems, and a fan mounted on said shaft for creating a flow of air which is delivered to said further cooling means to act as a heat sink.--.

Signed and Sealed this

First Day of August, 2006

JON W. DUDAS
*Director of the United States Patent and Trademark Office*